L. W. ANDERSEN.
FLEXIBLE CHAIN FOR LIGHTING FIXTURES.
APPLICATION FILED FEB. 26, 1912.
1,037,575.
Patented Sept. 3, 1912.
2 SHEETS—SHEET 2.
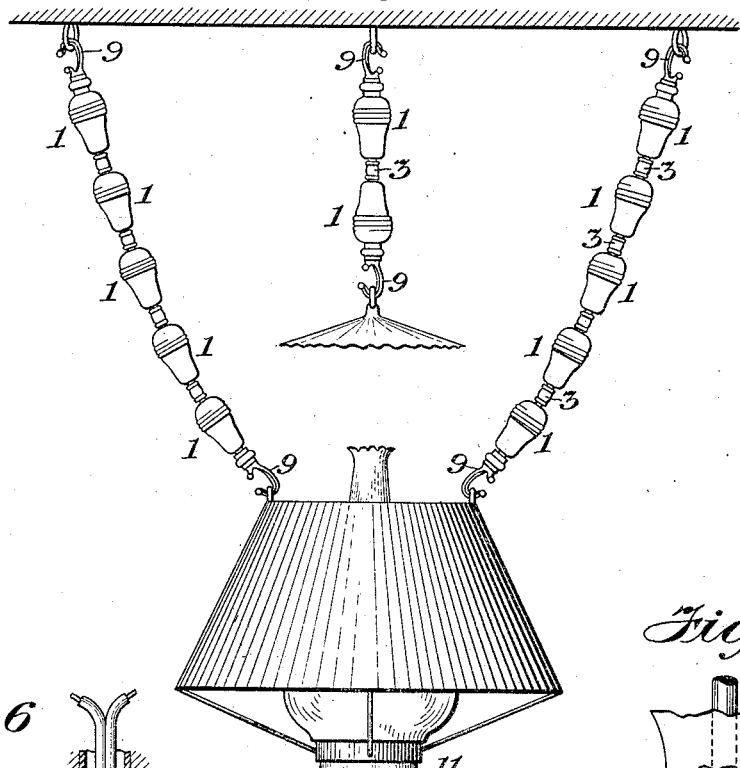
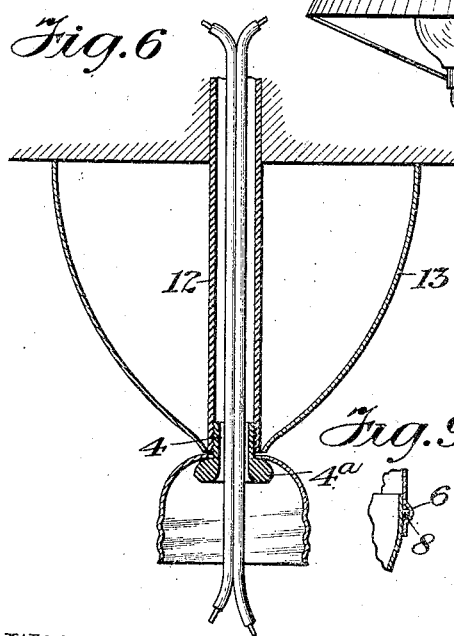
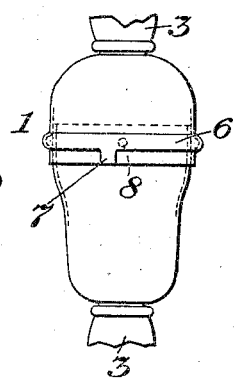
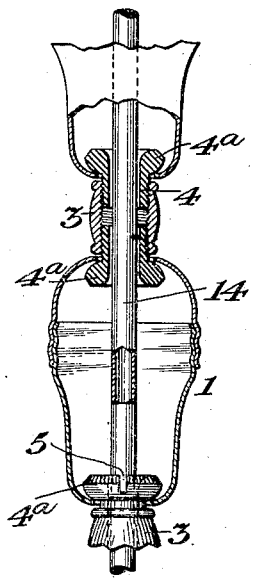
Witnesses:
Chas. F. Clagett
Geo. F. Pinckney
Inventor,
Lauritz W. Andersen
By Serrell & Son
his Attorneys.

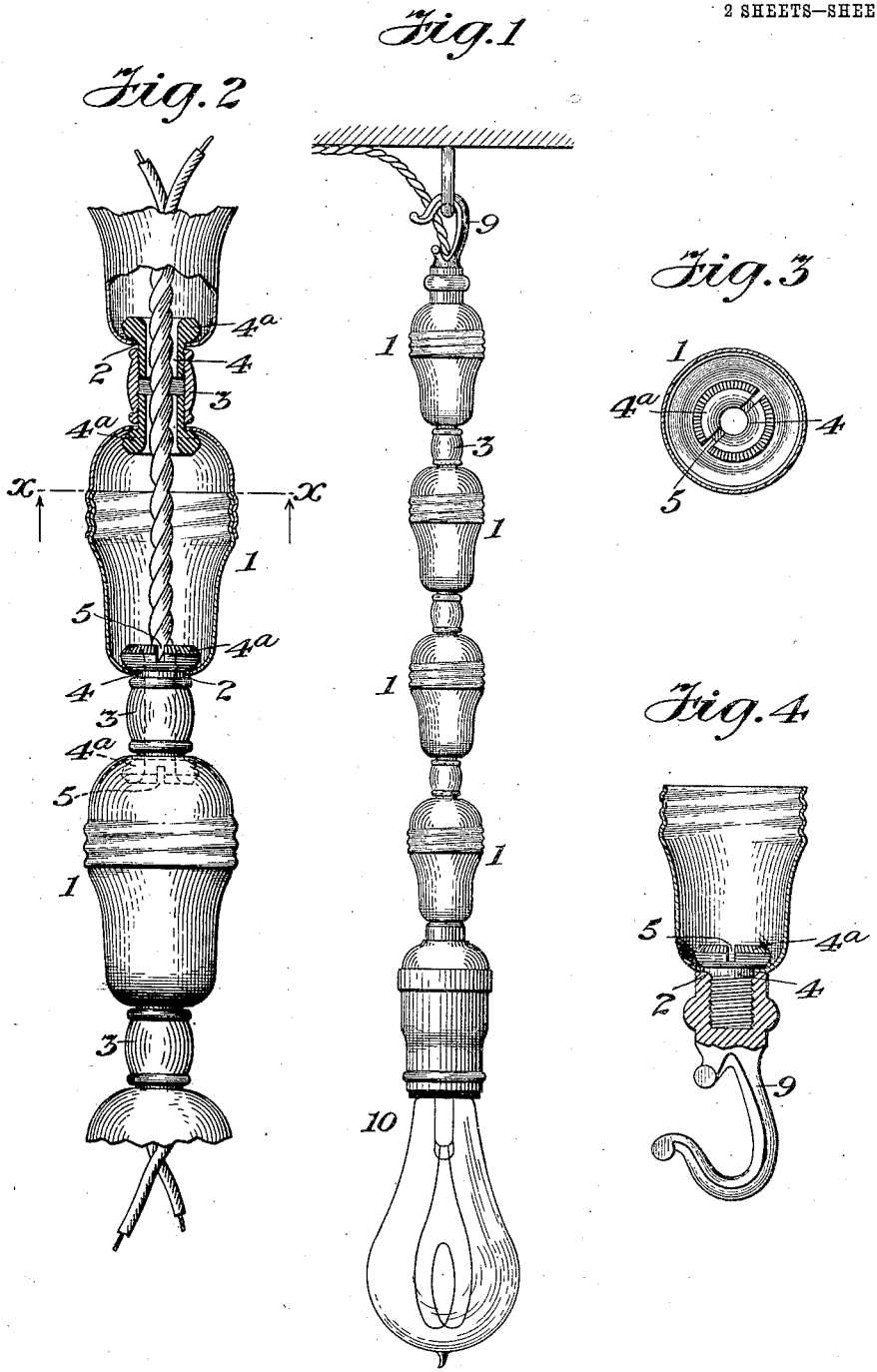

UNITED STATES PATENT OFFICE.

LAURITZ W. ANDERSEN, OF WATERBURY, CONNECTICUT, ASSIGNOR TO THE PLUME AND ATWOOD MANUFACTURING COMPANY, OF WATERBURY, CONNECTICUT, A CORPORATION OF CONNECTICUT.

FLEXIBLE CHAIN FOR LIGHTING-FIXTURES.

1,037,575.  Specification of Letters Patent.  Patented Sept. 3, 1912.

Application filed February 26, 1912. Serial No. 679,916.

*To all whom it may concern:*

Be it known that I, LAURITZ W. ANDERSEN, a citizen of the United States, residing at Waterbury, in the county of New Haven and State of Connecticut, have invented an Improvement in Flexible Chains for Lighting-Fixtures, of which the following is a specification.

My invention relates to chains for lighting fixtures, and its object is to provide a flexible extensible chain that may be used for supporting various kinds of lamps or chandeliers, and which is also applicable as a conduit chain for electric conductors, or adapted to form an ornamental cover for pipes or tubing, and it consists essentially in a plurality of shells with intervening spacers and couplings adapted to give flexibility to the chain.

My improved chain may be built up of any desired length, determined only by the number of the shells which are preferably divisible for the insertion of the couplers.

In the accompanying drawings in which similar reference characters indicate like parts throughout the several views; Figure 1 is an elevation of my improved chain supporting an electric lamp. Fig. 2 is an elevation of several connected shells in larger size partially in section. Fig. 3 is a cross section on the broken line *x. x.* of Fig. 2. Fig. 4 is a vertical section of one member of a shell connected to a hook. Fig. 5 is an elevation showing my improved chain as supporting an oil lamp. Fig. 6 is a vertical section showing the manner of use of my invention in connection with a conduit tube projecting through a ceiling and surrounded by a canopy. Fig. 7 is vertical view partially in section showing the use of my invention as an ornamental cover for a tube or pipe. Fig. 8 illustrates a modification in the manner of connecting the two members of the shells and Fig. 9 is a broken section showing the same modification.

The shells 1 are each composed of two parts, preferably screw threaded on their meeting ends, and provided with an opening 2 at their other ends.

The series of coupling members each comprise a tubular spacing member 3, interiorly threaded and two similar reversed thimbles 4 each having a head $4^a$ at one end and exteriorly threaded to screw into the spacing member 3 from opposite ends. These heads are preferably provided with transverse grooves or kerfs 5 to enable them to be manipulated by a screw-driver when desired or necessary. The under surface of these heads $4^a$ are tapered or shaped to conform to the interior shape of the shells 1 adjacent the openings therein through which the tubular portions of the coupling members 4 are to be passed. In assembling the parts of the chain one of these coupling members 4 is placed in each member of shell 1, with their tubular exteriorly screw-threaded portions projecting through the openings 2 in said shell. A spacer 3 is then screwed upon each projecing end of the coupling members, when the two parts of the shell are secured together by means of the screw threads upon their meeting ends. The screw-threaded ends of the couplers projecting through the openings in the next section at either end is then screwed into the other ends of the spacers and so on until the desired length of the chain is made up. It is preferable that the ends of the spacers 3 coming in contact with the shells 1, be flared or of a shape to fit the exterior shape of the ends of the shells, so that there may be but slight friction on the parts; the connections having the nature of universal joints.

While I prefer to provide screw-threads upon the meeting ends of the two members of each shell, it will be readily understood that they may be joined in any other suitable manner such for instance as shown in Figs. 8 and 9 where a circumferential rib 6, and connecting longitudinal ribs 7 oppositely arranged are formed in one member and teats 8, formed upon opposite sides of the other member which may be passed into the longitudinal ribs of the other member until they meet the interior of the circumferential rib whereby giving the one member a partial turn the two members will be held together.

The shells 1 are formed preferably of thin sheet metal and may be of any desired shape or configuration or ornamentation, providing a comparatively light chain which is highly ornamental in appearance and at the same time strong enough to support quite a weight.

My invention is applicable to various kinds of lamps or lighting fixtures. It may be provided at each end with hooks 9 for use with a suspended oil lamp 11 as shown in Fig. 5. It may be provided at its upper end only with a hook 9, for suspending an electric lamp 10 as shown in Fig. 1, in which case the lamp socket may be screwed directly to the screw threaded end of the coupler at the lower section of the chain, with the conductor wires passed through the bores in the spacers and couplers and within the shells and out through an opening in the hook at the upper end of the chain, or the screw threaded end of the coupler in the top section of the chain may be screwed into the end of a conduit tube 12, within a canopy 13, as shown in Fig. 6. It will also be readily understood that the bores in the couplers and spacers may be large enough to permit the passage of a tube or pipe 14, in which case the chain forms an ornamental cover for such tube or pipe. This is illustrated in Fig. 7.

I claim as my invention:

1. A chain comprising a plurality of shells provided with end apertures, tubular spacers intervening between such shells, and tubular coupling members by which such shells are flexibly united.

2. A chain comprising a plurality of shells composed of two parts each provided with an end opening, means for connecting such parts together, tubular spacers intervening between such shells, and tubular coupling members by which such shells are flexibly united.

3. A chain comprising a plurality of shells composed of two parts each provided with an end opening, means upon the meeting ends of the shells by which such parts are capable of connection, tubular interiorly screw-threaded spacers intervening between such shells, tubular coupling members provided with heads within said shells and having an exteriorly screw-threaded part extending outside such shells and adapted to screw into the screw-threaded spacers and by which the shells are flexibly united.

Signed by me this 17th day of February, 1912.

LAURITZ W. ANDERSEN.

Witnesses:
A. J. STORZ,
C. W. NORTHROP.